April 3, 1951 — T. HOMMEL — 2,547,527
PHOTOCOMPOSING MACHINE
Filed May 8, 1946 — 6 Sheets-Sheet 1

INVENTOR
THEODORE HOMMEL
By Alfred Wheatp
ATTORNEY

April 3, 1951     T. HOMMEL     2,547,527
PHOTOCOMPOSING MACHINE
Filed May 8, 1946     6 Sheets-Sheet 2

INVENTOR
THEODORE HOMMEL
ATTORNEY

INVENTOR
THEODORE HOMMEL
ATTORNEY

April 3, 1951 — T. HOMMEL — 2,547,527

PHOTOCOMPOSING MACHINE

Filed May 8, 1946 — 6 Sheets-Sheet 4

INVENTOR
THEODORE HOMMEL
ATTORNEY

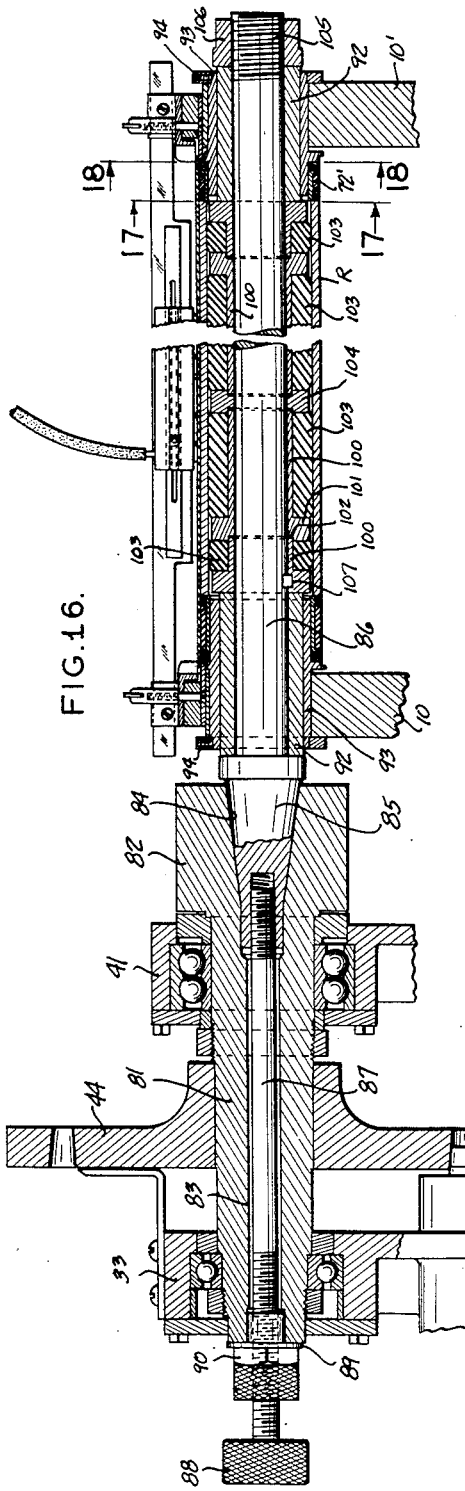
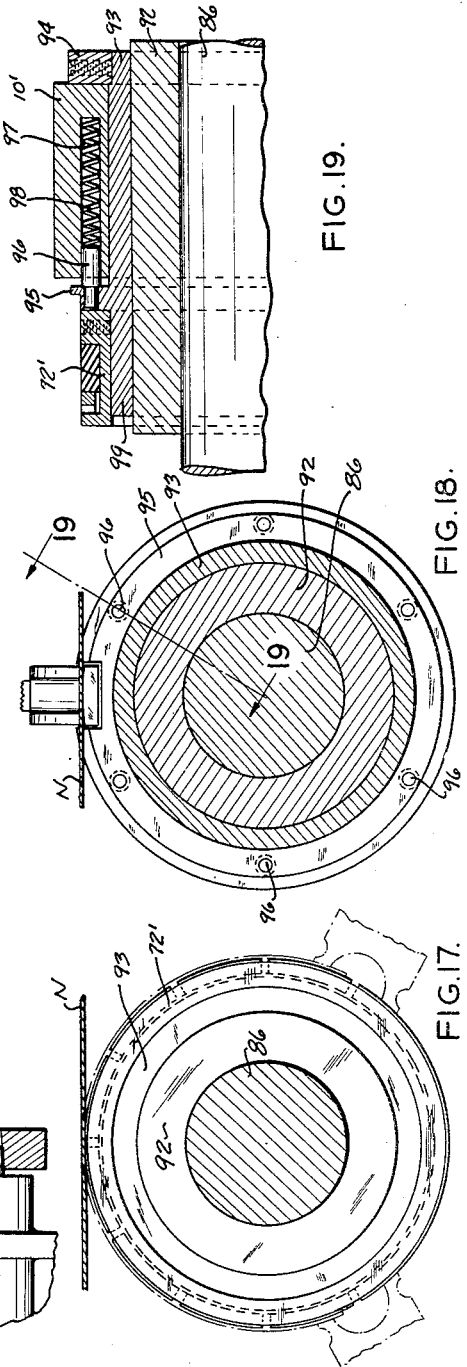

April 3, 1951 — T. HOMMEL — 2,547,527
PHOTOCOMPOSING MACHINE
Filed May 8, 1946 — 6 Sheets-Sheet 6

INVENTOR
THEODORE HOMMEL
By Alfred W. Petchaft
ATTORNEY

Patented Apr. 3, 1951

2,547,527

UNITED STATES PATENT OFFICE 2,547,527

PHOTOCOMPOSING MACHINE

Theodore Hommel, Normandy, Mo., assignor to
Universal Match Corporation, St. Louis, Mo.,
a corporation of Delaware Application May 8, 1946, Serial No. 668,178

8 Claims. (Cl. 95—76)

This invention relates in general to improved equipment and methods for photoengraving and, more particularly, to a type of photocomposing machine which may be referred to as a cylinder step-up machine.

In making photoengraved printing rolls and plates for use in conjunction with intaglio, offset, or letter-press printing presses, it is common practice to sensitize a carefully machined and polished flat or cylindrical surface by applying thereto a suitable light sensitive emulsion or chemical and thereupon exposing the sensitized surface through a suitable negative by conventional photographic technique, so that the design on the negative will be photographically imprinted upon the sensitized surface. Thereafter, the sensitized surface is subjected to a conventional series of chemical processes or developed, as it is commonly called, and, as a result, the design is imprinted upon the surface of the roller plate.

In most modern highspeed printing processes, it is necessary to have the design repeated successively a number of times upon the printing plate or roller in order that a plurality of the image-units may be printed during each cycle of the printing press. For example, on a rotary type of press, the design to be printed will be photoengraved upon a roller and will be repeated a number of times around the surface of the roller, so that the design, in effect, will form a continuous band or a continuous succession of uniformly spaced image-units and can be printed without interruption as sheets, strips, or webs of stock are fed through the press. The repetitive use of the design makes it necessary that the design be laid out and drawn upon the negative, so that it will have a width precisely equal to some aliquot portion of the circumferential length of the roller. For example, a roller having a circumferential length of exactly twelve inches would accommodate six repeats of a design having a width of exactly two inches. Because of unavoidable errors of draftsmanship in drawing the design of the negative, as well as errors and tolerances of machining in finishing and polishing the printing roll, the design may be several hundredths of an inch over size or under size and the roller may be several hundredths of an inch over size or under size. Sometimes these deviations may be corrective and other times accumulative, with the result that in most cases there is a slight overlapping or deviation between two adjacent repeats of the design and, since such an error will cause a misprinting on two repeats, the net result is that one-third of the product is improperly printed and may even require rejection. This type of error becomes particularly serious when a set of rollers is being prepared for multi-color printing operations. In such cases, the errors will produce faulty registration of the several colors and frequently destroys the value of the entire piece of work.

It is hence the primary object of the present invention to provide a photocomposing machine of the cylinder step-up type which is simple and economical and is capable of extremely precise construction and operation, so that mechanical errors in the production of image-units or so-called "repeats" is substantially eliminated.

It is a further object of the present invention to provide a machine of the type stated which may be employed in a manner so that any errors, mechanical or otherwise, which may exist, either in the negative or the sensitized cylinder, will be distributed uniformly and evenly between all of the several repeats of the photoengrave design so as to be substantially unnoticeable in the finished work.

It is an additional object of the present invention to provide a machine of the type stated in which the negative and the several repeats on the sensitized cylinder are registered from the center of the design, so that improved accuracy of registration may be achieved in multi-color printing operations.

It is also an object of the present invention to provide a machine of the type stated which is so simple in operation that there is virtually no possibility of error due to faulty manipulation on the part of the operator.

It is likewise an object of the present invention to provide a machine of the type stated in which a comparatively small film negative is required, so that errors due to atmospheric conditions, shrinkage, and distortion of the film are substantially prevented.

It is furthermore an object of the present invention to provide a machine of the type stated having means for holding the film negative in close precise contact with the sensitized surface of the cylinder in order to assure photoengraving having fine, precise detail.

And with the above and other objects in view, my invention resides in the novel features of form, construction, arrangement, and combination of parts presently described and pointed out in the claims.

In the accompanying drawings (six sheets)—

Figure 1:
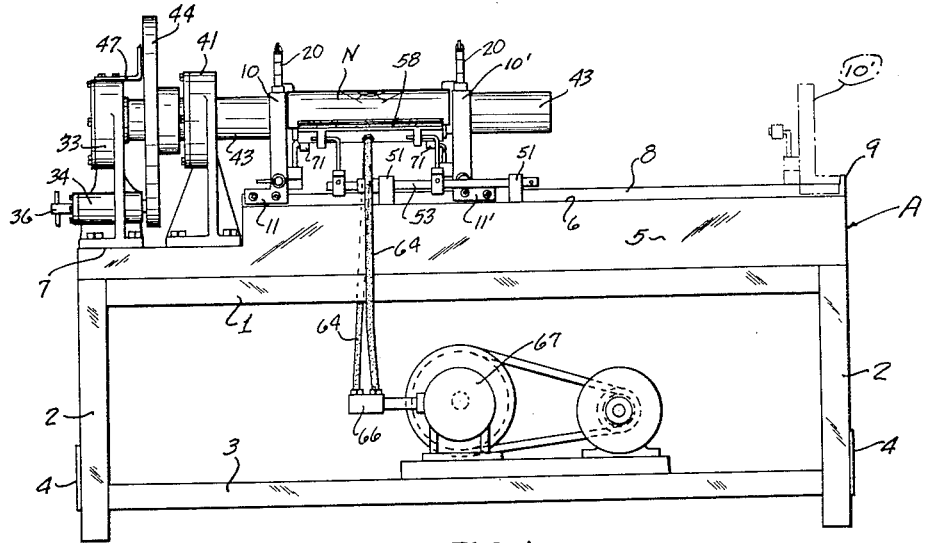
Figure 1 is a side elevational view of a cylinder step-up machine constructed in accordance with and embodying the present invention.
Figure 2:
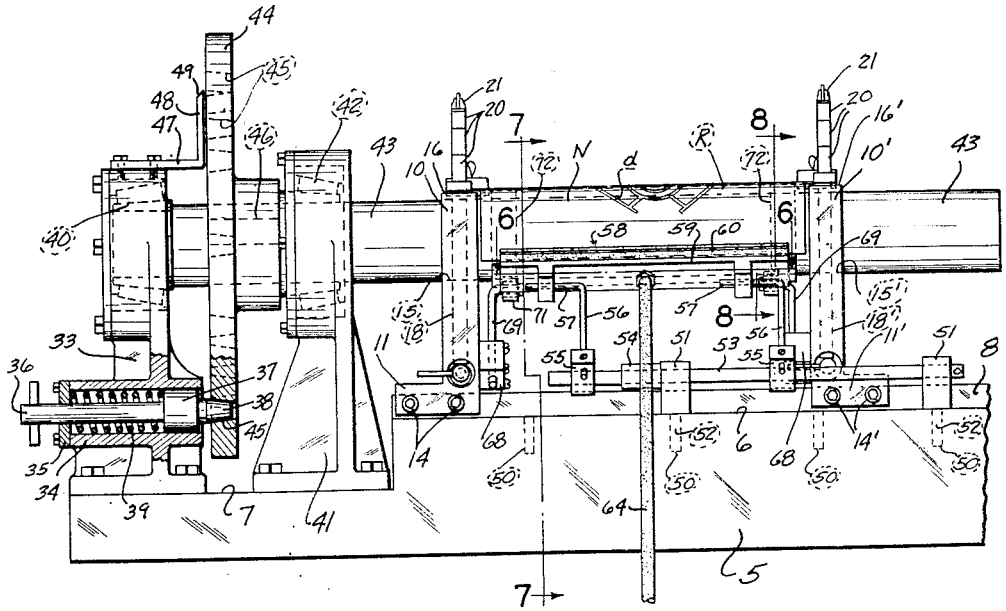
Figure 2 is an enlarged side elevational view, partly broken away and in section, of the cylinder step-up machine.
Figure 3:
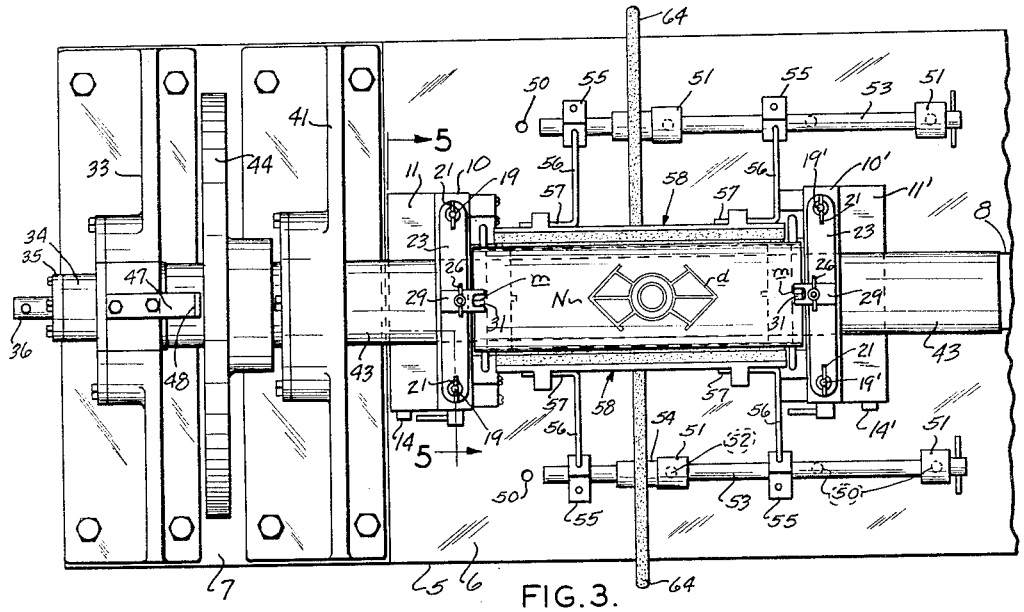
Figure 3 is a fragmentary top plan view of the cylinder step-up machine.
Figure 4:
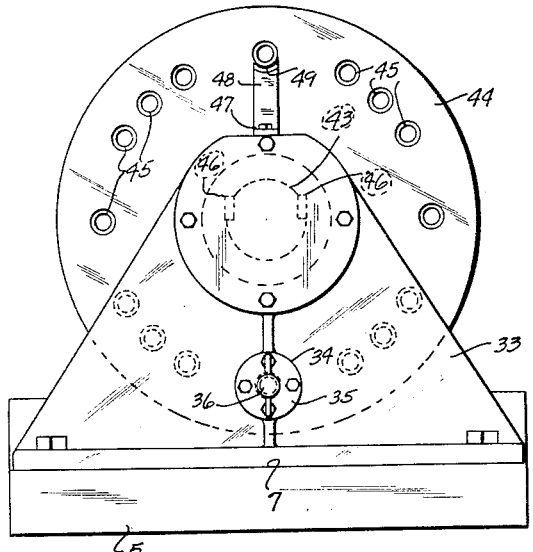
Figure 4 is an end elevational view of the cylinder step-up machine.
Figure 5:
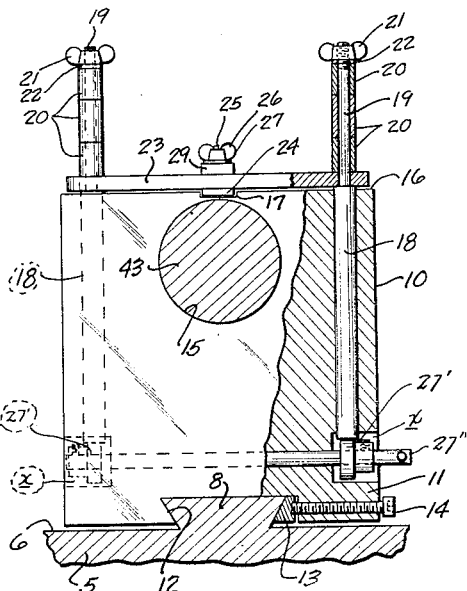
Figure 5 is a transverse sectional view taken along the line 5—5 of Figure 3.
Figure 6:
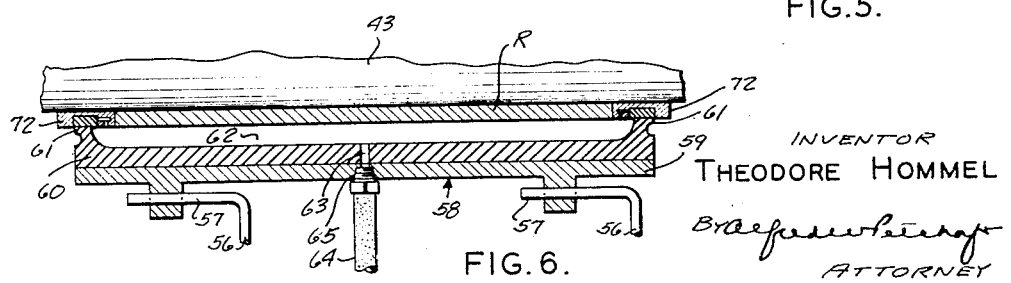
Figure 7:
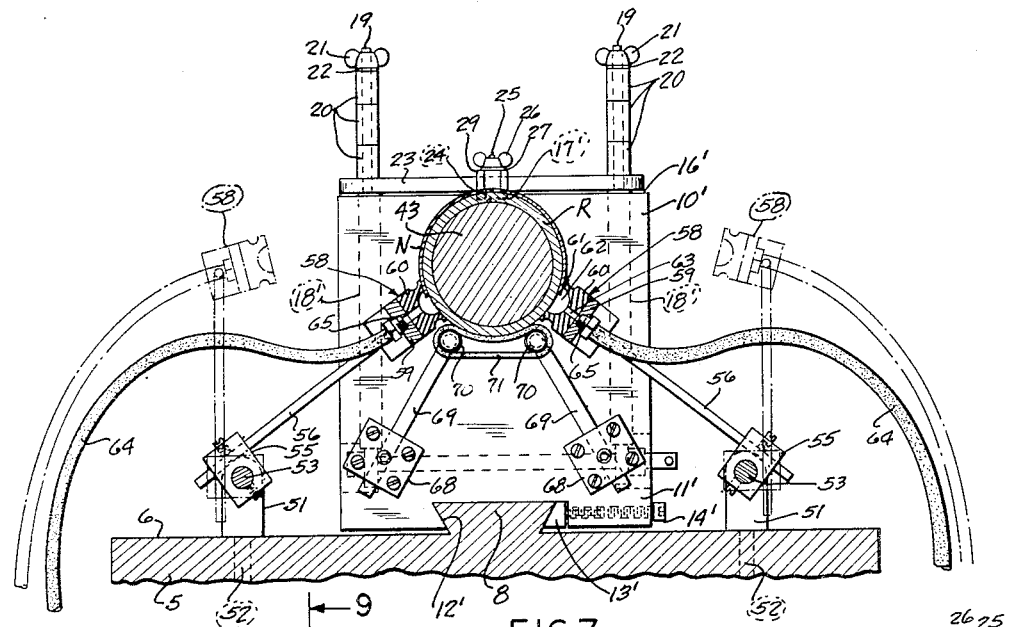
Figures 8, 9:
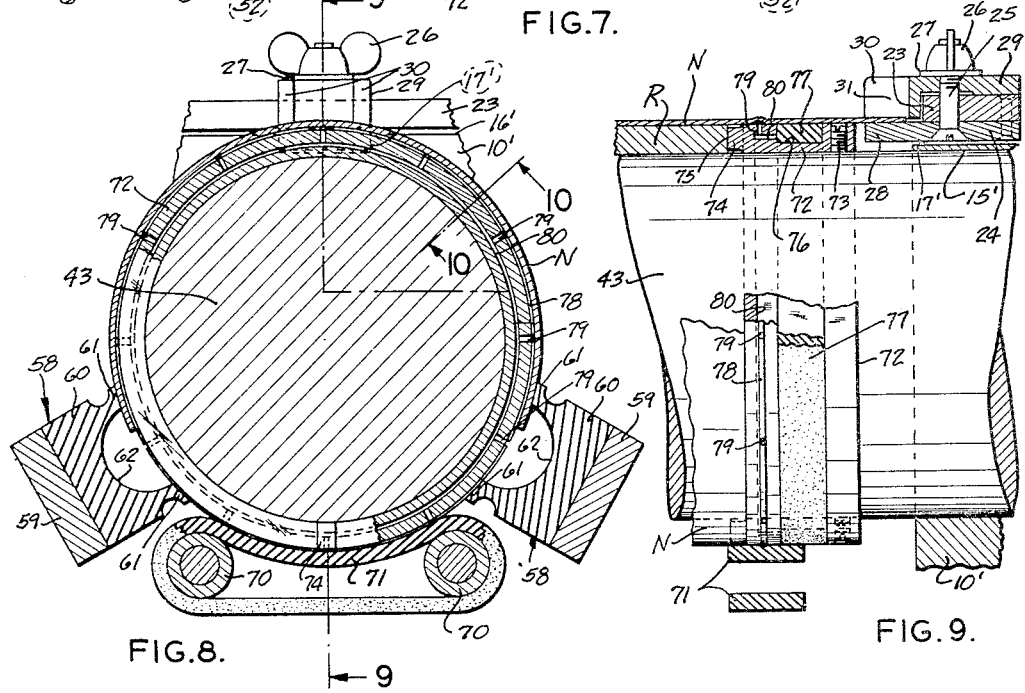
Figure 10:
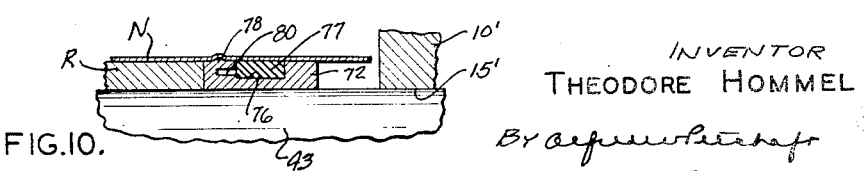
Figure 11:
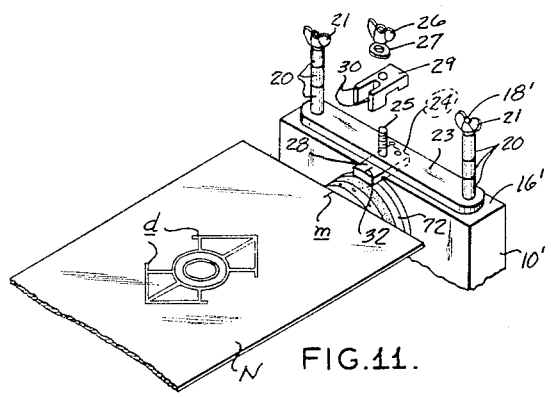
Figure 12:
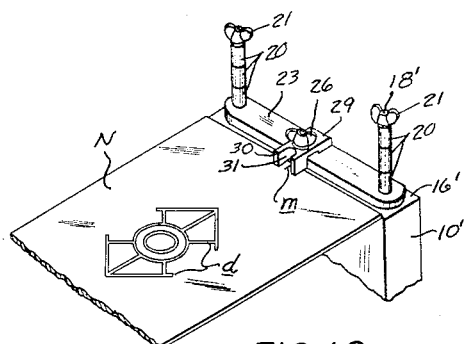
Figure 13:
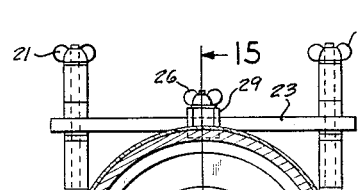
Figure 14:
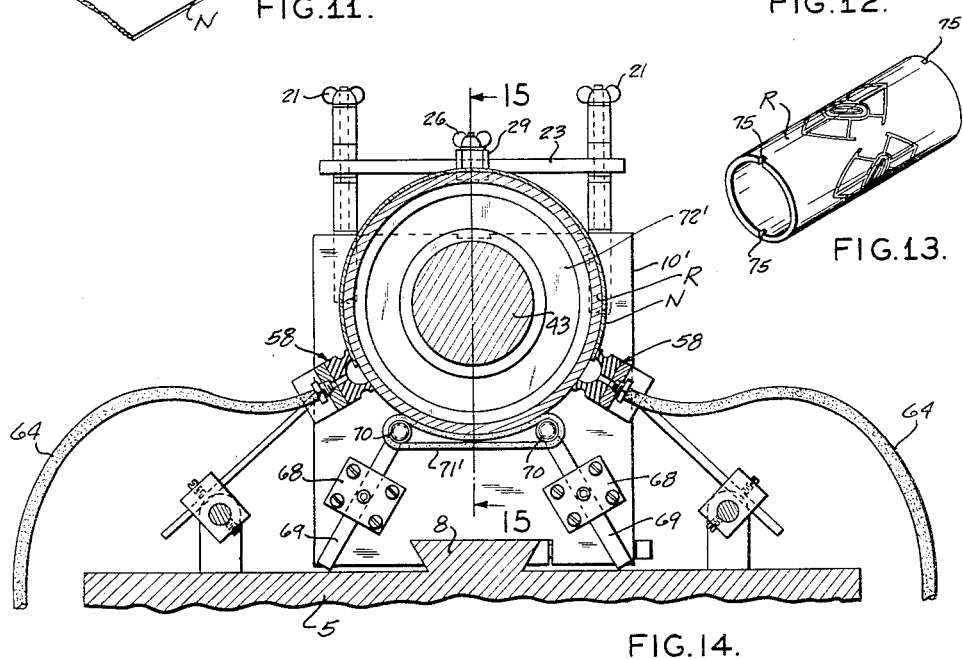
Figure 15:
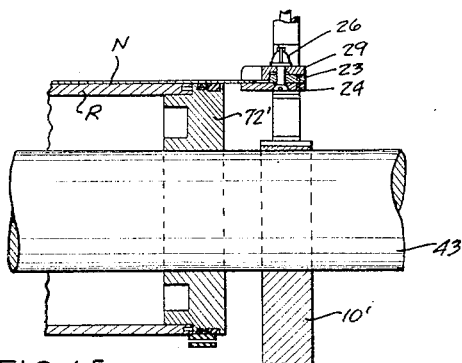
Figure 20:
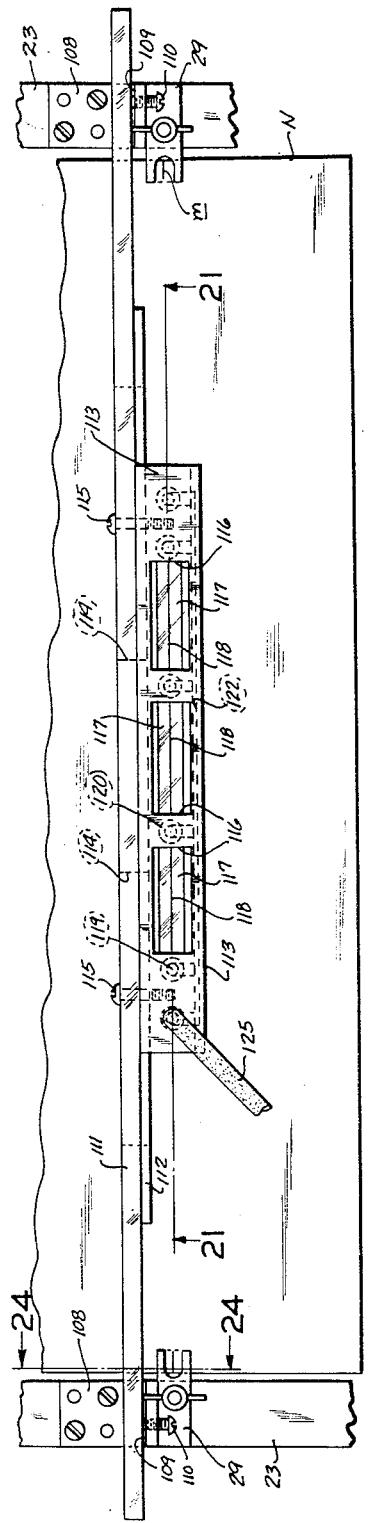
Figure 21:
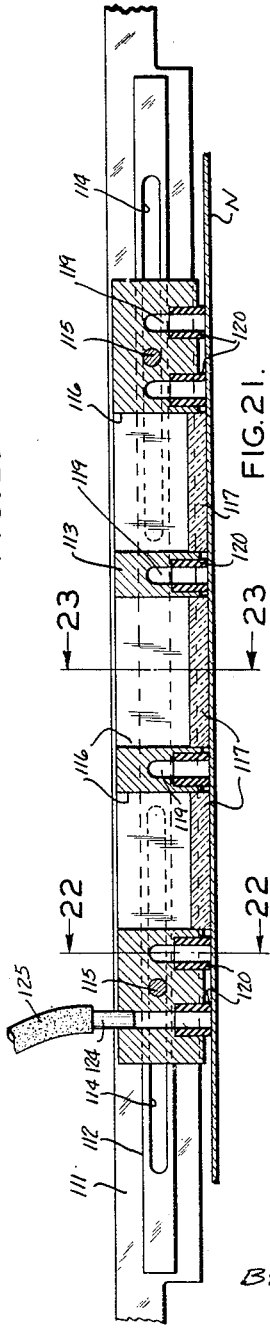
Figure 24:
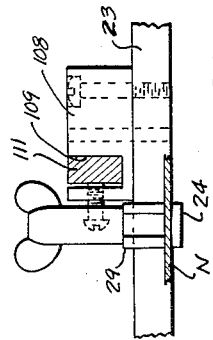
Figure 23:
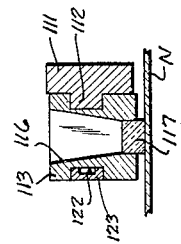
Figure 22:
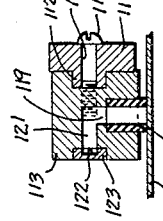

Figures 6, 7, and 8 are transverse sectional views taken along the lines 6—6, 7—7, and 8—8, respectively, of Figure 2;

Figures 9 and 10 are fragmentary sectional views taken along the lines 9—9 and 10—10, respectively, of Figure 8;

Figure 11 is a fragmentary exploded view of the negative holder forming a part of the present invention;

Figure 12 is a fragmentary assembled view of the negative holder of the present invention;

Figure 13 is a perspective view of a finished sensitized cylinder;

Figure 14 is a transverse sectional view showing the cylinder step-up machine adjusted for operation upon a sensitized cylinder having relatively large diametral size;

Figure 15 is a fragmentary sectional view taken along the line 15—15 of Figure 14;

Figure 16 is a fragmentary sectional view of a modified form of mandrel construction and sensitized roll mounting means forming a part of the present invention;

Figures 17 and 18 are transverse sectional views taken along lines 17—17 and 18—18, respectively, of Figure 16;

Figure 19 is a fragmentary sectional view taken along line 19—19 of Figure 18;

Figure 20 is a top plan view of an auxiliary negative holder adapted for use with extremely long negatives;

Figure 21 is a longitudinal sectional view taken along line 21—21 of Figure 20;

Figures 22 and 23 are transverse sectional views taken along lines 22—22 and 23—23, respectively, of Figure 21; and Figure 24 is a transverse sectional view taken along line 24—24 of Figure 20.

Referring now in more detail and by reference characters to the drawings, which illustrate practical embodiments of the present invention, A designates a cylinder step-up machine having a rectangular horizontal top frame 1 constructed preferably of welded angle iron and provided at its four corners with vertical depending legs 2 rigidly braced adjacent their lower extremities by horizontal cross beams 3 and side plates 4. Bolted or otherwise rigidly secured upon and extending across the top frame 1 is a cast iron bed plate 5 provided with two precisely machined horizontal surfaces 6, 7, the surface 6 being of relatively greater area and higher elevation than the surface 7 and being centrally provided with a longitudinally extending male dovetail 8, which is, in turn, provided at its outer end with an upstanding stop abutment 9.

Slidably mounted for movement into various relative positions along the surface 6 is a pair of mandrel supporting slides 10, 10', integrally provided at their lower extremities with shoe portions 11, 11', having precisely machined dovetail grooves 12, 12', for complementary sliding engagement with the male dovetail 8. Working within the grooves 12, 12', are locking wedges 13, 13', actuated by locking screws 14, 14', whereby the slides 10, 10', may be locked rigidly at any suitable position along the male dovetail 8. The slides 10, 10', are furthermore provided at their upper ends with precisely aligned and concentric, horizontally extending bearing apertures 15, 15', and horizontal top faces 16, 16', the latter being provided with precisely machined grooves 17, 17', the center lines of which are disposed vertically above and in precise alignment with the axial line of the bearing apertures 15, 15'.

Removably and shiftably mounted in the slides 10, 10', equidistantly on opposite sides of the grooves 17, 17', and extending vertically upwardly above the top surfaces 16, 16', are pairs of posts 18, 18', the upper ends of which are diametrally reduced in the provision of mounting studs 19, 19', for receiving a plurality of spacing collars 20. At their upper ends, the mounting studs 19, 19', are threaded for receiving wing nuts 21 and washers 22 by which the collars 20 may be held in place. Also provided for precisely fitting slidable disposition upon the pairs of mounting studs 19, 19, and 19', 19', are clamping bridges 23, and precisely pinned upon the under faces of each of the bridges 23 are centering blocks 24 adapted to fit loosely within the grooves 17, 17'. Upon their upper faces, each of the bridges 23 is provided with an upwardly extending threaded post 25 for receiving a wing nut 26 and washer 27.

At their lower ends, the posts 18, 18', project into suitably formed recesses $x$ and ride upon circular eccentric collars 27' pinned to shafts 27'' which are rotatably mounted in and extend horizontally through the slides 10, 10'. Thus, the pairs of posts 18, 18', may be simultaneously lifted by rotation of the shafts 27''.

Formed integrally with, and extending forwardly from, the centering block 24, is a clamping tongue 28, the upper surface of which is arcuately ground to the mean radius of the printing rollers for which the machine A is primarily designed, and loosely mounted upon the threaded posts 25 are clamping blocks 29 each having a pair of forwardly extending clamping fingers 30 ground upon their under faces to the same radius as the upper face of the tongue 28 and spaced from each other in the provision of a slot 31 through which it is possible to observe an indexing mark or line 32 etched or otherwise suitably engraved upon the upper face of the clamping tongue 28. It should be noted in this connection that this indexing mark 32 is precisely aligned with the center line of the bearing apertures 15, 15'.

Bolted or otherwise secured upon the upper face of the surface 7 is a head stock 33 integrally provided with a horizontally disposed cylinder 34 closed at its outer end by an end plate 35. Slidably mounted in, and extending through, the end plate 35 is a plunger rod 36 integrally provided interiorly of the cylinder 34 with a diametrally enlarged plunger portion 37 and having an outwardly projecting tapered locking tongue 38. Between the inner faces of the end plate 35 and plunger portion 37 is a spiral compression spring 39 for normally urging the locking tongue 38 outwardly from the cylinder 34. At its upper end, the head stock 33 is provided with a horizontally extending roller bearing 40 co-axially aligned with the bearing apertures 15, 15', of the slides 10, 10', all as best seen in Figure 2.

Also rigidly mounted upon the surface 7 and spaced inwardly from the head stock 33 is an auxiliary supporting post 41 provided at its upper end with a roller bearing 42 likewise co-axially aligned with the bearing apertures 15, 15', and roller bearing 40. Rotatably mounted within the bearings 40, 42, 15, and 15', is a mandrel 43 provided along that portion of its length extending between the head stock 33 and auxiliary supporting post 41 with a large disk-like positioning collar 44 having a plurality of equally spaced annularly arranged tapered apertures 45, each adapted to receive the tapered locking tongue 38, the collar 44 being positively held in concentric position upon the mandrel 43 by means of Lewis keys 46. It will, of course, be apparent that when the positioning collar 44 is securely locked in place, the mandrel 43 may be rotated step by step. Mounted upon the upper face of the head stock 33, is an L-shaped guide arm 47 having a vertical leg 48 provided at its upper extremity with an arcuately ground guide recess 49 for precise alignment with the several apertures 45, so that the aperture may observe that the positioning collar 44 is accurately locked in any one of its several predetermined positions.

At equally spaced intervals on either side of the male dovetail 8, the surface 6 is provided with vertical drill holes 50, and adapted for disposition on opposite sides of the male dovetail 8, are pairs of adjustable vacuum frame posts 51 having downwardly projecting pins 52 adapted to fit snugly within any one of the drill holes 50. It will thus be evident that the pairs of vacuum frame posts 51 can be shifted to any one of the drill holes 50 so as to be located in different relative positions to each other, depending upon the relative positions of the slides, 10, 10'. Rotatably mounted in, and extending horizontally through, the pairs of posts 51, are shafts 53 provided with suitable set collars 54 by which they are held against longitudinal movement. Also adjustably mounted upon the shaft 50, are pairs of vacuum frame blocks 55 adjustably provided with outwardly extending arms 56, which are, in turn, bent over at their outer ends and provided with horizontal legs 57. Rockably mounted upon the legs 57, are vacuum frames 58 comprising a horizontal bar 59 provided on its exposed face with a cementitiously secured soft rubber contact shoe 60 having an externally presented continuous peripheral lip 61 and an elongated oval-shaped channel or groove 62 formed in its outer face and communicating an aperture 63 with a flexible vacuum line 64, which is secured by means of a suitable threaded fit 65 in the bar 59 and extends downwardly to the suction connection 66 of a conventional motor driven vacuum pump assembly 67, which is, in turn, rigidly mounted upon the frame braces 3. Swingably mounted upon the inner face of the slides 10, 10', equidistantly on opposite sides of the center line thereof, are blocks 68 and adjustably mounted therein are rods 69 bent over at their upper ends and provided with small horizontally disposed rollers 70 for receiving loop-shaped rubber sealing bands 71, all as best seen in Figure 7 and for purposes presently more fully appearing.

Provided for snug fitting slidable and rotatable disposition upon the mandrel 43 is a pair of suction rings 72 provided at one end with a plurality of annularly spaced set screws 73 by which the suction rings may be clamped at any relative position along the portion of the mandrel 43 between the slides 10, 10'. Upon their inwardly presented side faces, the suction rings are provided with projecting pins 74 adapted to fit snugly within positioning slots 75 formed in the annular edges of the sensitized printing roll R. Intermediate its ends, each suction ring is provided with an annular suction groove 76 for receiving a rubber sealing ring 77. The outer circumferential face of a portion of the ring 72 between the grooves 76 and the inner end thereof is provided with an annular upstanding band 78 which is in turn radially drilled at equidistantly spaced intervals in the formation of radial suction ports 79 all connected inwardly of the ring by an annularly milled or undercut suction channel 80, the exposed side of which is sealed by the side face of the sealing ring 77.

In actual use, the sensitized roller R is slipped over the mandrel 43 and locked in place therein by means of the suction rings 72. The slides 10, 10' are adjusted with respect to each other and the rest of the printing roller R, and locked in place. It will, of course, be understood, that the cylinder step-up machine will be located in a dark room so that the sensitized roller R can be handled without premature exposure.

Meanwhile, a suitable negative N has been prepared in a drafting room by direct drawing upon a transparency or by any conventional photographic method. The design is laid out, so that the negative bears center line marks $m$ which are aligned with the marks 32 on the clamping tongues 28 and the clamping fingers 30 are forced down into tight engagement upon the upper face of the negative N by means of the wing nuts 27, thereby clamping the negative N tightly and securely in place in such position that its center line is precisely and accurately disposed in alignment with the center line of the mandrel 43, as best seen in Figure 2.

Thereupon, the free longitudinal margins of the negative N may be manually bent down and around the sensitized printing roller R, so that the negative N lies directly upon the sensitized surface thereof. The vacuum frames 58 are thereupon swung from the position shown in dotted lines to the position shown in full lines in Figure 7, so that the longitudinal margins of the negative N extend into, but not across, the recesses 62 of the vacuum frames 58. Furthermore, the recess 62 extends outwardly so as to include and communicate with at least one of the suction ports 79 of each sealing ring 72. The negative N extends over the band 78 upon the surface of the rubber gasket ring 77 and covers a number of such suction ports 79. In this position, the vacuum frames 58 are locked in place and the arms 69 are swung upwardly to such a position that the rubber rings 71 extend across and close to the remaining suction ports 79 which are not closed by the vacuum frames 58 and negative N. Thereupon, the vacuum pump is turned on and all of the air sucked out from between the inner face of the negative N and the outer face of the sensitized roller R, so that the negative N will be held in intimate smooth contact throughout its entire area with the sensitized surface of the roller R by means of external atmospheric pressure. While held in such position, the exposure light within the dark room may be turned on a calculated interval of time, exposing one segmental section of the sensitized roller R through the light transmitting portions $d$ of the design on the negative N. Thereupon, with the room again in darkened condition, the vacuum pump 67 is turned off and the vacuum frames 58 withdrawn, thereby releasing the negative N. The plunger rod 36 is then pulled outwardly, withdrawing the tapered tongue 38 from engagement in one of the apertures 45 of the positioning collar 44 and the mandrel 43 may thereupon be rotated by rotation of the positioning collar 44 until the next adjacent aperture is aligned with the locking tongue 38, whereupon the plunger 36 may be released, so that the positioning collar 44 and the mandrel 43 will again be locked in the next succeeding position. The negative N may then again be clamped into proper position for exposure and exposed. This operation may be repeated for the necessary number of times to completely expose all of the several segments of the sensitized roller R to produce the desired number of "repeats" thereon.

It will be apparent that any drafting or mechanical errors in either the design on the negative N or in the sensitized roller R will be uniformly distributed throughout all of the repeats and will thus be reduced to an almost unnoticeable quantity. Furthermore, the center line of any and all mandrels thus exposed for purposes of a multicolor printing job will register perfectly, since the center line of the design is always accurately aligned with the center line of the particular printing roller R which is being exposed.

When it is desired to employ sensitized rollers of relatively large diameter, the clamping bars 23 may be moved upwardly, so that the center line of the upwardly presented clamping face of the clamping tongue 28 is disposed at the proper radial distance from the center line of the mandrel 43 and again securely held in such position by the wing nuts 21, proper adjustments being made in the vacuum frames 58 and the arms 69, a somewhat differently sized sealing band 71' being disposed around the rollers 70 and a suction ring 72' of suitable diametral size being operatively mounted on the mandrel 43, all as best seen in Figures 14 and 15.

If desired, I may provide a modified form of mechanism for holding the sensitized rolls R as shown in Figures 16 to 19, inclusive. In this modified form, the long mandrel 43 is omitted and a short arbor shaft 81 is substituted therefor. The arbor shaft 81 is journaled in the head stock 33 and supporting post 41 and is keyed to the positioning collar 44 in substantially the same manner as the mandrel 43. At one end, the arbor shaft 81 projects a short distance outwardly from the supporting post 41 and is diametrally enlarged in the provision of a socket butt 82. The shaft 81 is furthermore provided with an axial bore 83 extending from end to end and being diametrally enlarged in the region of the socket butt 82 in the provision of a tapered arbor socket 84 adapted for receiving the tapered end 85 of a removable arbor 86, which is axially tapped at its socket-enclosed end for receiving a threaded locking rod 87 which extends through the bore 83 and projects outwardly at the opposite end of the shaft 81, being provided at such projecting end with a large knurled knob 88. Just inwardly of the knob 88, the rod 87 is provided with a washer 89 and a locking nut 90.

The arbor 86 extends axially outwardly from the socket 84 through shiftable sleeves 92, which, in turn, extend rotatably and shiftably through bearing collars 93 mounted in and projecting through the slides 10, 10', and being provided at their outer projecting ends with set collars 94. On their inwardly projecting ends, the bearing collars 93 are integrally provided with diametrally enlarged annular flanges 95 having a plurality of annularly spaced axially projecting pins 96 which work reciprocably in axially extending drill holes 97 formed in the slides 10, 10', in alignment with the pins 96 and housing compression springs 98 by which the pins 96 and the associated bearing collars 93 are urged inwardly with respect to the slides 10, 10', thereby allowing for a limited amount of axial shifting movement or end play therein. The end portions 99 of the bearing collars 93 are externally machined to snugly accommodate the suction rings 72'. It should be noted that the slides 10, 10', will be set so that the axial distance between the opposing ends of the suction rings 72' is slightly less than the overall length of the sensitized roll which is to be processed and the springs 98 will thereby be slightly compressed to take up this difference in length adjustment. Consequently, the suction rings 72' will be held against the sensitized roll with a limited amount of axial pressure.

Provided for snug-fitting shiftable disposition upon the arbor 86, is a plurality of sleeves 100 each provided integrally at one end with a diametrically enlarged flange 101 which is counterbored, as at 102, to fit telescopically around the unflanged end of any one of the other sleeves 100. Mounted snugly on and around the outside of each of the sleeves 100, is a relatively thick-walled rubber sleeve 103 having an external diametral size slightly greater than the external diametral size of the flanges 101 and slightly smaller than the standard inside diametral size of the sensitized roller R which is to be processed on the machine. The rubber sleeves furthermore abut at one end against the inside radial face of the flange 101 and at the other end are flush with the end face of the sleeve 100. It should be noted in this connection that the sleeves 100 are made up in various different lengths, so that, by assembling them in various arrangements and combinations, it will be possible to accommodate sensitized rolls of various different lengths. It will, of course, be evident that a set of such sleeves 100 and matching suction rings 72' must be made up having inside and outside diametral sizes to match and accommodate sensitized rollers R of various selected diametral sizes.

Also provided for disposition upon the arbor 86 is an adapter ring 104 substantially similar to the flanges 101 of the sleeves 100 except that it is counterbored upon both of its radial faces for accommodating the unflanged ends of the sleeves 100. This adapter ring 104 may be placed on the arbor 86 approximately midway of the sensitized roller R so as to permit a symmetrical arrangement of sleeves 100. The arbor 86 furthermore is threaded at its free end 105 and is provided with a tightening nut 106. Thus, when a plurality of appropriately sized sleeves 100 are in place on the arbor 86 and a sensitized roller R is mounted therearound, the nut 106 may be tightened down, shifting the sleeve 92 inwardly and forcing each one of the sleeves 100 inwardly into the counterbored recesses 102 and thereby imposing axial pressure more or less uniformly upon all of the rubber sleeves 103 and causing the latter to bow or "belly" outwardly into tight gripping engagement with the roller R. Preferably, the endmost sleeve 100 is provided with a key 107 by which it is tightly held to the arbor 86, so that the entire assembly will be held non-rotatably thereon.

In order to provide for the use of very long negatives and corresponding sensitized rollers, the bridges 23 may be provided with upstanding lugs 108 having upwardly opening vertical slots 109 provided with set screws 110. The lugs 108 are mounted on their respective bridges 23 in such a manner that the slots 109 are in precise alignment lengthwise of the machine. Removably secured within the slots 109 by means of the set screws 110 is a long straight support bar 111 preferably of rectangular cross-section and being provided on one vertical face with an outwardly projecting tongue 112 for shiftably accommodating a complementarily grooved bar-shaped auxiliary holder 113. The bar 111 is furthermore provided in the region of the tongue 112 with two longitudinally spaced slots 114 for shiftably accommodating retainer bolts 115 which extend therethrough and are threaded into the auxiliary holder 113. It will thus be evident that the bolts 115 may be loosened and the auxiliary holder 113 shifted through a fairly extensive range of lengthwise adjustment along the tongue 112 of the support bar 111.

The auxiliary holder 113 projects laterally from the support bar 111 and extends across the center line of the machine, as defined by the index marks 32 of the clamping tongues 28, and is provided with three rectangular apertures 116 extending therethrough from top to bottom and located at more or less uniformly spaced intervals therealong. Mounted across the bottoms of the apertures 116, are sight glasses 117. The under faces of the sight glasses 117 are all disposed in a common plane spaced slightly downwardly from the under face of the auxiliary holder 113 so as to rest neatly upon the upper face of the negative N when the latter is mounted in operative position. The sight glasses 117 furthermore are provided with longitudinally extending hairline scratches 118, all precisely aligned with the indexing marks 32, as best seen in Figure 20 and for purposes presently more fully appearing.

Upon its under face, the auxiliary holder 113 is provided with a plurality of vertical drill holes 119 counterbored at their lower ends to receive tubular rubber shoes 120, the latter terminating at their ends in the same planes as the under faces of the sight glasses 117. The several drill holes 119 are laterally connected by horizontal drill holes 121 and a laterally milled channel 122, which is, in turn, for machining convenience, covered by a rectangular closure plate 123. Mounted in the auxiliary holder 113 and opening to the channel 122 is a tube 124 connected by a rubber hose 125 to the suction pump manifold 66.

When a long negative N and correspondingly long roller R are being processed, the negative may be mounted in the bridges 23 in the manner previously described. Because of its length, the negative may tend to bow in one direction or the other and produce inaccurate results unless supported intermediate its ends. Accordingly, the bar 111 and auxiliary holder 113 are installed in the lugs 108 and the negative is provided at several points intermediate its ends with short continuations of its center line. These short continuations will be accurately brought into coincidence with the hairline scratches 118 and the suction applied through the holder 113, thereby holding the negative N in true and straight alignment throughout its length. It will, of course, be understood that when the ends of the negative N are folded down around the cylinder or roller R and held in operative position by the vacuum frames 58, the suction on the auxiliary holder 113 may be turned off and the auxiliary holder 113 removed from the lugs 108 while the exposure is being made. As soon as the exposure has been completed, the support bar 111 and auxiliary holder 113 are replaced and the suction again turned on, so that the negative N will be again held in true alignment thereby, whereupon the vacuum frames 58 may be released, freeing the negative N and permitting the cylinder or roller R to be rotated stepwise to its next position for the next exposure.

It should be understood that changes and modifications in the form, construction, arrangement, and combination of the several parts of the cylinder step-up machine may be made and substituted for those herein shown and described without departing from the nature and principle of my invention.

Having thus described my invention, what I claim and desire to secure by Letters Patent is:

1. A photo-composing machine for stepping up a film negative upon a photo-sensitized printing roller comprising a frame having spaced parallel bearings, a mandrel rotatably mounted upon and extending through said bearings for concentrically receiving and supporting said roller, means associated with said mandrel for optionally holding said mandrel in any one of a series of selected positions of rotation, rings mounted on the mandrel for endwise engagement with the roller, said rings having a plurality of suction ports, means for holding a film negative over the mandrel so that the center line of the negative is disposed accurately in spaced parallel relation to the center line of the mandrel and the end margins project over the rings, longitudinally extending suction members for releasably holding the longitudinal margins of the film negative in closely conformed overlying relationship upon the roller, and means for drawing air from between the negative and roller by suction exertion through the suction ports of the rings and through the suction members.

2. A photo-composing machine for stepping up a film negative upon a photo-sensitized printing roller comprising a frame having spaced parallel bearings, a mandrel rotatably mounted upon and extending through said bearings for concentrically receiving and supporting said roller, means associated with said mandrel for optionally holding said mandrel in any one of a series of selected positions of rotation, means for marginally gripping a film negative and holding it over the mandrel so that the center line of the negative is disposed accurately in spaced parallel relation to the center line of the mandrel, and suction means for withdrawing the air from between the film negative and the roller so that atmospheric pressure upon the outer face of the negative will force the negative into closely conformed overlying relationship upon the roller.

3. A photo-composing machine for stepping up a film negative upon a photo-sensitized printing roller comprising a frame having spaced parallel bearings, suction rings carried by the bearings, a mandrel rotatably mounted upon and extending through said bearings for concentrically receiving and supporting said roller, means associated with said mandrel for optionally holding said mandrel in any one of a series of selected positions of rotation, means for holding a film negative over the mandrel so that the center line of the negative is disposed accurately in spaced parallel relation to the center line of the mandrel and the transverse margins thereof extend over the suction rings, suction bars for releasably holding the longitudinal margins of the film negative down upon the roller, and means for applying suction to the rings and bars for withdrawing air from between the negative and the roller.

4. A photo-composing machine including a supporting frame, a mandrel rotatably mounted in said frame, a collar mounted concentrically on said mandrel and having an annular series of uniformly spaced apertures, a locking pin on the frame engageable within any one of said apertures for optionally holding said mandrel in any one of a series of selected positions, a pair of film holders spaced from each other lengthwise of the mandrel, a single clamp on each film holder, said clamps having their center lines precisely aligned with the center line of the mandrel and with each other, rings mounted on the mandrel for endwise engagement with the roller, said rings having a plurality of suction ports, means for holding a film negative over the mandrel so that the center line of the negative is disposed accurately in spaced parallel relation to the center line of the mandrel and the end margins project over the rings, longitudinally extending suction members for releasably holding the longitudinal margins of the film negative in closely formed overlying relationship upon the roller, and means for drawing air from between the negative and roller by suction exertion through the suction ports of the rings and through the suction members.

5. A photo-composing machine including a supporting frame, a mandrel rotatably mounted in said frame, a collar mounted concentrically on said mandrel and having an annular series of uniformly spaced apertures, a locking pin on the frame engageable within any one of said apertures for optionally holding said mandrel in any one of a series of selected positions, a pair of film holders spaced from each other lengthwise of the mandrel, a single clamp on each film holder, said clamps having their center lines precisely aligned with the center line of the mandrel and with each other, rings mounted on the mandrel for endwise engagement with the roller, said rings having a plurality of suction ports, film holders mounted on the frame and having clamp members adapted to grip only the central portions of transverse margins of the negative leaving the lengthwise margins free to be moved down manually into operative position against the roller, said clamps being positioned accurately in spaced parallel relation to the center line of the mandrel and the end margins project over the rings, longitudinally extending suction members for releasably holding the longitudinal margins of the film negative in closely formed overlying relationship upon the roller, and means for drawing air from between the negative and roller by suction exertion through the suction ports of the rings and through the suction members.

6. A photo-composing machine including a supporting frame, a mandrel rotatably mounted in said frame, a collar mounted concentrically on said mandrel and having an annular series of uniformly spaced apertures, a locking pin on the frame engageable within any one of said apertures for optionally holding said mandrel in any one of a series of selected positions, a pair of film holders spaced from each other lengthwise of the mandrel, a single clamp on each film holder, said clamps having their center lines precisely aligned with the center line of the mandrel and with each other, rings mounted on the mandrel for endwise engagement with the roller, said rings having a plurality of suction ports, means for holding a film negative over the mandrel so that the center line of the negative is disposed accurately in spaced parallel relation to the center line of the mandrel and the end margins project over the rings, longitudinally extending suction members for releasably holding the longitudinal margins of the film negative in closely formed overlying relationship upon the roller, said suction members extending at their ends over the rings and being in communication with the suction ports thereof, and means for drawing air from between the negative and roller by suction exertion through the suction ports of the rings and through the suction members.

7. A photo-composing machine including a supporting frame, a mandrel rotatably mounted in said frame, a collar mounted concentrically on said mandrel and having an annular series of uniformly spaced apertures, a locking pin on the frame engageable within any one of said apertures for optionally holding said mandrel in any one of a series of selected positions, a pair of film holders spaced from each other lengthwise of the mandrel, a single clamp on each film holder, said clamps having their center lines precisely aligned with the center line of the mandrel and with each other, rings mounted on the mandrel for endwise engagement with the roller, said rings having a plurality of suction ports each connected with the other interiorly of the ring, means for holding a film negative over the mandrel so that the center line of the negative is disposed accurately in spaced parallel relation to the center line of the mandrel and the end margins project over the rings, longitudinally extending suction members for releasably holding the longitudinal margins of the film negative in closely formed overlying relationship upon the roller, said suction members extending at their ends over the rings and being in communication with the suction ports thereof, and means for drawing air from between the negative and roller by suction exertion through the suction ports of the rings and through the suction members.

8. A photo-composing machine for stepping-up a film negative upon a photosensitized film roller, comprising a frame having spaced parallel bearings, a mandrel rotatably mounted upon and extending through said bearings for concentrically receiving and supporting said roller, means for marginally gripping a film negative and holding it over the mandrel, a pair of suction rings slidably fitted upon said mandrel and disposed for rotation therewith, said suction rings being provided with a plurality of radial suction ports, longitudinally extending suction members adapted to engage the longitudinal margins of the negative and simultaneously seal the suction ports adjacent the longitudinal margins of the negative, and a loop-shaped sealing band disposed between said suction members and adapted to seal the suction ports disposed between said suction members.

THEODORE HOMMEL.

REFERENCES CITED

The following references are of record in the file of this patent:

UNITED STATES PATENTS

| Number | Name | Date |
|---|---|---|
| 1,978,736 | Bommer | Oct. 30, 1934 |
| 2,091,280 | Huebner | Aug. 31, 1937 |
| 2,174,882 | Huebner | Oct. 3, 1939 |
| 2,338,878 | Stead | Jan. 11, 1944 |
| 2,387,421 | Bergh | Oct. 23, 1945 |

FOREIGN PATENTS

| Number | Country | Date |
|---|---|---|
| 551,735 | Germany | June 4, 1932 |
| 460,848 | Great Britain | Feb. 4, 1937 |